(12) United States Patent
Breen

(10) Patent No.: US 7,413,525 B2
(45) Date of Patent: *Aug. 19, 2008

(54) HYDRAULIC CONTROL SYSTEM FOR POWER TRANSMISSION ASSEMBLY

(75) Inventor: Timothy W. Breen, E. Syracuse, NY (US)

(73) Assignee: Magna Powertrain USA, Inc., Troy, MI (US)

(*) Notice: Subject to any disclaimer, the term of this patent is extended or adjusted under 35 U.S.C. 154(b) by 307 days.

This patent is subject to a terminal disclaimer.

(21) Appl. No.: 11/388,066

(22) Filed: Mar. 23, 2006

(65) Prior Publication Data

US 2006/0166776 A1 Jul. 27, 2006

Related U.S. Application Data

(63) Continuation of application No. 10/916,106, filed on Aug. 11, 2004, now Pat. No. 7,059,987.

(60) Provisional application No. 60/496,454, filed on Aug. 20, 2003.

(51) Int. Cl.
*F16H 31/00* (2006.01)
(52) U.S. Cl. ..................................... 475/116
(58) Field of Classification Search ................ 475/116; 192/87.18, 87.13
See application file for complete search history.

(56) References Cited

U.S. PATENT DOCUMENTS

| 2,774,257 | A | | 12/1956 | Brooks |
| 3,301,367 | A | | 1/1967 | Yokel |
| 3,393,586 | A | | 7/1968 | Zundel |
| 3,747,727 | A | * | 7/1973 | Dach et al. ................ 192/18 A |
| 3,776,066 | A | | 12/1973 | Piret |
| 4,541,515 | A | | 9/1985 | Nishimura et al. |
| 6,843,745 | B2 | | 1/2005 | Fritschle |
| 7,059,987 | B2 | * | 6/2006 | Breen ......................... 475/116 |

* cited by examiner

*Primary Examiner*—Dirk Wright
(74) *Attorney, Agent, or Firm*—Harness, Dickey & Pierce, P.L.C.

(57) ABSTRACT

A power compounder, for transmitting rotary power from a transmission to a driveline assembly includes a housing adapted to be mounted to the transmission. An input shaft is rotatably supported by the housing and adapted to be driven by the transmission. The compounder further includes an output shaft adapted to drive the driveline assembly and a gearset. The gearset selectively communicates rotational movement between the input and output shafts. A centralized passageway is formed in the input shaft. A separator insert is disposed in the passageway and is adapted to carry fluid at a first pressure to a first predetermined location and carry fluid at a second pressure to a second predetermined location.

14 Claims, 4 Drawing Sheets

US 7,413,525 B2

HYDRAULIC CONTROL SYSTEM FOR POWER TRANSMISSION ASSEMBLY

CROSS-REFERENCE TO RELATED APPLICATIONS

This application is a continuation of U.S. patent application Ser. No. 10/916,106 filed on Aug. 11, 2004, now U.S. Pat. No. 7,059,987, which claims benefit of U.S. Provisional Application No. 60/496,454 filed on Aug. 20, 2003.

FIELD OF THE INVENTION

The present invention relates generally to power transmission assemblies for use in motor vehicles and, more specifically, to a compounder assembly that is operable to establish at least one additional speed ratio when used in conjunction with a multi-speed automatic transmission.

BACKGROUND OF THE INVENTION

Due to the lead time and expense required to design and build new multi-speed automatic transmissions, some motor vehicles are equipped with an auxiliary or "add-on" gearbox to provide one or more additional gear ratios. Some motor vehicles use this auxiliary gearbox to compound the gear ratios provided by the conventional automatic transmission so as to provide the additional gear ratios. Typically, such "compounders" include a planetary gearset and one or more clutches and/or brakes that can be selectively actuated to establish a direct drive mode and either of an underdrive ratio mode or an overdrive ratio mode. As is known, the direct drive mode provides a one-to-one gear ratio. On the other hand, the ratio drive modes provide a gear ratio other than one-to-one which, in conjunction with the multiple speed ratios established by the automatic transmission, provides a simple and relatively inexpensive means for establishing additional drive gears.

With reference to FIG. 8, a prior art compounder assembly 8 will be described. To manufacture compounder assembly 8, a first bore B1 is drilled into an input shaft for carrying fluid at a first pressure. A second bore B2 is drilled into the input shaft for carrying fluid at a second pressure. Typically, first bore B1 is adapted to carry fluid for influencing clutch actuation during a gearshift event while the second bore B2 carries fluid for lubrication. While such compounders have proven to work satisfactorily for their intended purpose, a need exists to minimize complexity while advancing the state of the art.

SUMMARY OF THE INVENTION

A compounder assembly for transmitting rotary power from a transmission to a driveline includes a housing adapted to be mounted to the transmission. An input shaft is rotatably supported by the housing and adapted to be driven by an output shaft of the transmission. The compounder assembly further includes an output shaft, a planetary gearset between the input and output shafts, and a plurality of torque transfer devices arranged to selectively couple components of the planetary gearset. The planetary gearset selectively transfer rotary power (i.e., drive torque) from the input shaft to the output shaft. In accordance with a unique feature of the present invention, an elongated central passageway is formed in the input shaft. A port separator insert is disposed in the central passageway and is adapted to carry fluid at a first pressure to a first predetermined location and carry fluid at a second pressure to a second predetermined location.

Further areas of applicability of the present invention will become apparent from the detailed description provided hereinafter. It should be understood that the detailed description and specific examples, while indicating the preferred embodiment of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
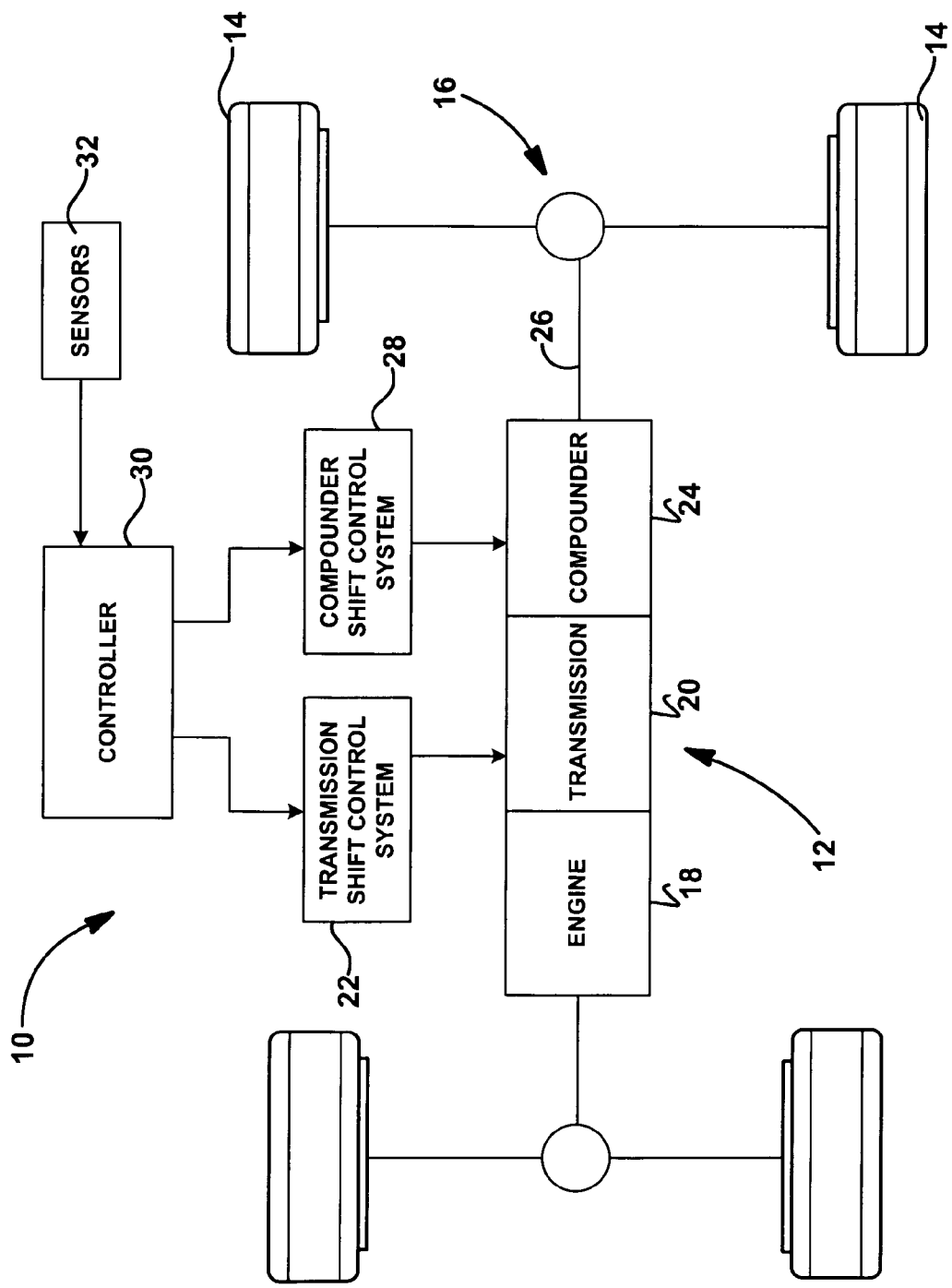
FIG. 1 is a schematic diagram of a motor vehicle with one or more power transmission devices according to the present invention.

Referring to FIG. 1, a motor vehicle drivetrain 10 is schematically illustrated to include a powertrain 12 for delivery motive power (i.e. drive torque) to wheels 14 of a primary driveline assembly 16. Powertrain 12 includes an internal combustion engine 18 and an automatic multi-speed transmission 20. Transmission 20 includes a plurality of torque transfer devices (i.e., clutches, brakes, etc.) under the control of an electro-hydraulic shift control system 22 that can be selectively actuated to establish a distinct number of forward gear ratios and at least one reverse gear ratio.

In an effort to promote smoother transmission shifting and greater fuel efficiency, it is known to equip powertrain 12 with an auxiliary or add-on power transmission assembly, hereinafter referred to as compounder assembly 24, for permitting the establishment of additional forward gear ratios. Compounder assembly 24 is operably installed between the output shaft of transmission 20 and a driveshaft 26 associated with driveline assembly 16. As will be detailed, compounder assembly 24 also includes torque transfer devices that are controlled by an electro-hydraulic shift control system 28 for establishing either of a direct drive connection or a ratio drive connection between the output shaft of transmission 20 and driveshaft 26. In order to coordinate shifting of the torque transfer devices in transmission 20 and compounder assembly 24, a transmission controller 30 is provided which selectively controls actuation of transmission shift control system 22 and compounder shift control system 28 in response to signals from various vehicle sensors 32. The signals from vehicle sensors 32 are inputted to controller 30 and used to develop control signals that are delivered to the shift system actuators for establishing the desired gear ratio drive connection between engine 18 and driveshaft 26.

Figure 2:
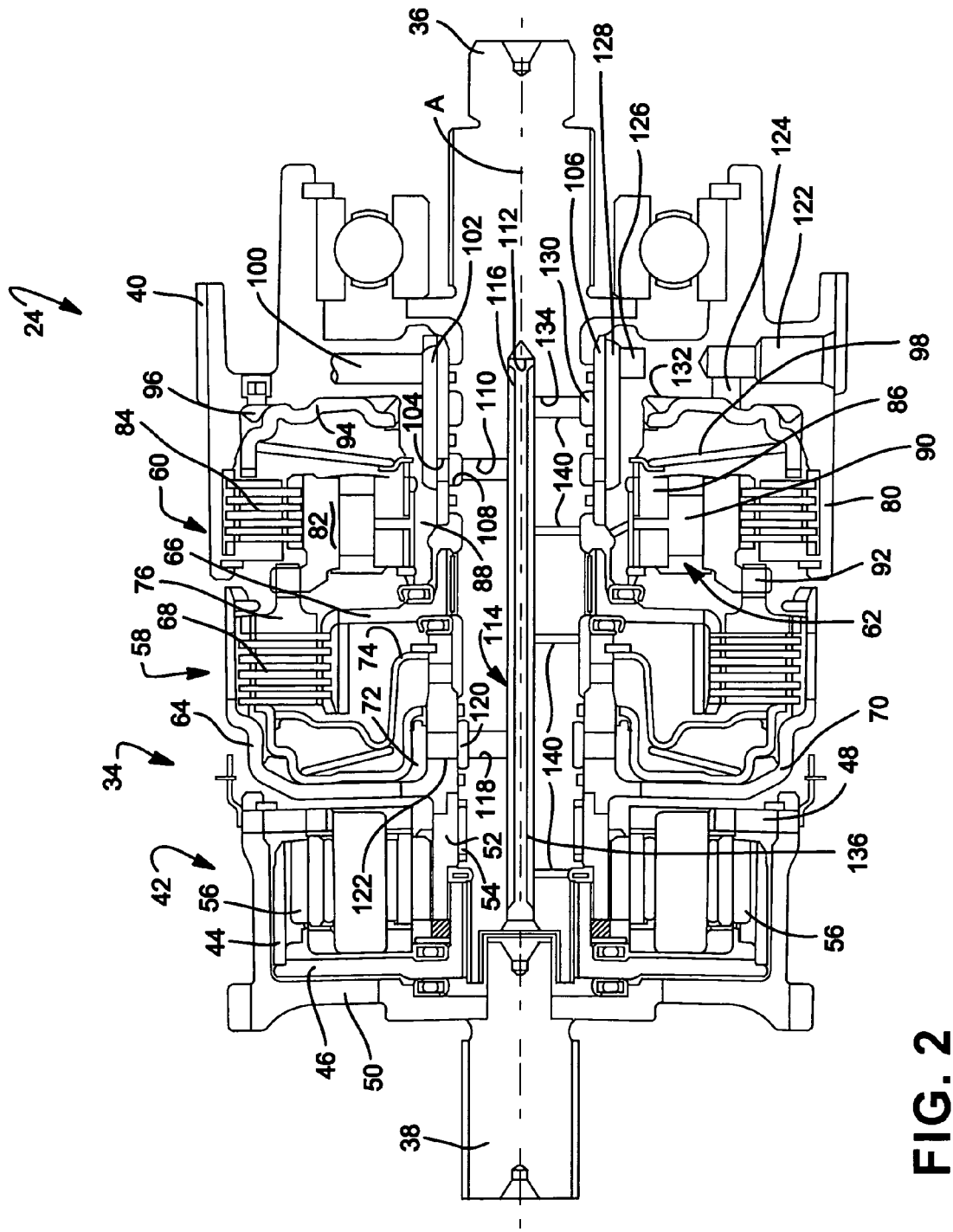
FIG. 2 is a sectional view of a compounder assembly according the present invention.

With reference to FIG. 2, the components associated with compounder assembly 24 will now be described in greater detail. Compounder assembly 24 includes an underdrive unit 34 which is operable to selectively interconnect an input shaft 36 and an output shaft 38 for establishing both of the direct and ratio drive connections therebetween. Input shaft 38 and output shaft 38 are rotatably supported within a housing 40 and are coaxially aligned such that they rotate about a common longitudinal axis "A". While not shown, it is understood that input shaft 36 is adapted for connection to and rotation with the output shaft of transmission 20. Likewise, output shaft 38 is adapted for connection to and rotation with driveshaft 26 of driveline assembly 16.

Underdrive unit 34 includes a planetary gearset 42 having an input member driven by input shaft 36, a reaction member, and an output member driving output shaft 38. In this regard, the input member of planetary gearset 42 includes a ring gear 44 which is driven by input shaft 36. In particular, ring gear 44 is rigidly secured to a drive ring 46 which is fixed (i.e., splined) for rotation with input shaft 36. The output member of planetary gearset 42 includes a planet carrier 48 fixed to a driven ring 50 which, in turn, is fixed for rotation with output shaft 38. A sun gear 52 acts as the reaction member in planetary gearset 42 and is rotatably supported on input shaft 26 by a bearing assembly 54. A plurality of planet gears 56 are rotatably supported from planet carrier 48 and meshed with ring gear 44 and sun gear 52.

Underdrive unit 34 is further shown to include a direct clutch 58, an underdrive clutch 60, and an overrunning clutch 62. Direct clutch 58 includes a clutch drum 64 fixed for rotation with sun gear 52, a clutch hub 66 fixed for rotation with input shaft 36, and a friction clutch pack 68 having interleaved clutch plates operably installed between drum 64 and hub 66. Direct clutch 58 also includes a piston 70 supported for sliding movement in a pressure chamber 72 formed within drum 64, and a spring assembly 74 for biasing piston 70 relative to clutch pack 68. As seen, a reaction plate 76 also is fixed (i.e., splined) for rotation with drum 64. Direct clutch 58 is operable in a locked mode when piston 70 exerts a compressive clutch engagement force on clutch pack 68 sufficient to couple drum 64 for rotation with hub 66, thereby coupling sun gear 52 for common rotation with input shaft 36. In contrast, direct clutch 58 is operable in a released mode when piston 70 is retracted from clutch pack 68 such that drum 64 and sun gear 52 are permitted to rotate relative to input shaft 36.

Underdrive clutch 60 includes a clutch drum 80 that extends from housing 40, a clutch hub 82, and a clutch pack 84 of interleaved clutch plates installed therebetween. As seen, hub 82 also acts as an outer race member of overrunning clutch 62 which further includes an inner race 86 that is fixed to a hub extension 88 of housing 40 and rolling lock members 90 disposed therebetween. In addition, hub 82 is shown to be coupled to reaction plate 76 of direct clutch 58 via a set of interdigitated lugs 92. Underdrive clutch 60 also includes a piston 94 supported for sliding movement in a pressure chamber 96 formed in housing 40 between drum 80 and hub extension 88, and a bias spring 98 acting on piston 94. Underdrive clutch 60 is operable in a released mode when spring 98 biases piston 94 to a retracted position such that hub 66 is permitted to rotate relative to housing 40. In contrast, underdrive clutch 60 is operable in a locked mode when piston 94 engages clutch pack 84 such that hub 82 is braked against rotation. Such braking of hub 82 also causes reaction plate 76 and drum 64 to be braked against rotation, thereby braking rotation of sun gear 52.

As is conventional, automatic transmission 20 is equipped with a series of control valves for controlling the supply and discharge of high pressure fluid to actuators associated with transmission shift control system 22. The control valves receive electric control signals from controller 30. The source of fluid used to supply hydraulic fluid to the actuators is maintained in a sump region within transmission 20. As is conventional, pump and accumulator arrangements within transmission 20 draw fluid from the sump and provide fluid at high actuation pressures to the control valves. In a like manner, compounder assembly 24 is also equipped with a series of control valves for controlling the fluid pressure delivered to pressure chamber 72 of direct clutch 58 and to pressure chamber 96 of underdrive clutch 60, as well as for delivering fluid to a lubrication circuit within underdrive unit 34. In this regard, a first flow path within compounder assembly 24 for providing fluid to pressure chamber 72 of direct clutch 58 is shown to include an inlet passage 100 and a channel 102 formed in housing 40, a through bore 104 formed in a journal bushing 106 located between housing 40 and input shaft 36, and a circumferential channel groove 108 formed in input shaft 36. A radial inlet bore 110 connects groove 108 to an elongated central longitudinal bore 112 formed in input shaft 36. Preferably, bore 112 is gun-drilled so as to be coaxial with rotary axis "A" of input shaft 36. As will be detailed, an elongated separator insert 114 is installed in bore 112 to define at least two distinct flow channels therein. A first flow channel 116 in separator insert 114 provides fluid communication between radial inlet bore 110 and a radial outlet bore 118 and a circumferential outlet groove 120 formed in input shaft 36. To conclude the first flow path, a throughbore 122 in a hub segment of drum 64 permits fluid in outlet groove 120 to communicate with pressure chamber 72.

A second flow path for underdrive clutch 60 is shown to include a port 122 in housing 40 and an inlet passage 124 which communicates with pressure chamber 96. Likewise, a third flow path is provided to circulate fluid for lubricating and cooling the components of underdrive unit 34. This third flow path includes an inlet passage 126 and a channel 128 formed in housing 40, a bore 130 through journal bushing 106, a circumferential groove 132 and a radial inlet bore 134 formed in input shaft 36, and a second flow channel 136 established by separator insert 114 within elongated central bore 112. As seen, a series of radial lubrication bores 140 connect second flow channel 136 to various lubrication bores formed in input shaft 36 which, in turn, supply lubricant to components of underdrive unit 34.

In operation, a first control valve would be selectively actuated to control the delivery of fluid from the pressure source to pressure chamber 72, thereby controlling shifting of direct clutch 58 between its released and locked modes. Likewise, a second control valve would be selectively actuated to control the delivery of fluid from the pressure source to pressure chamber 96, thereby controlling shifting of underdrive clutch 60 between its released and locked modes. Delivery of fluid to the third flow path for lubrication and cooling can, if required, be controlled by a third control valve for regulating the flow of fluid from the pressure source. Preferably, the fluid source for compounder assembly 24 is the same as transmission 20, namely, the hydraulic fluid maintained in the sump of transmission 20. As such, passages 100, 122 and 126 would be connected thereto via suitable hosing or piping.

Figure 3:
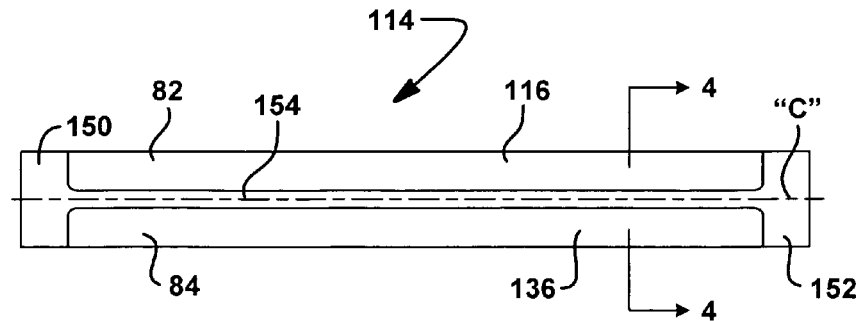
FIG. 3 is a sectional view of the separator insert according to a first embodiment of the present invention.
Figure 4:
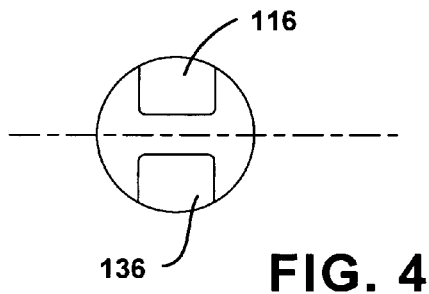
FIG. 4 is a sectional view of the separator insert of FIG. 3 taken along line 4-4.

Referring now to FIGS. 3 and 4, separator insert 114 is shown to include first and second circular end rings 150 and 152, respectively, and a planar divider plate 154 therebetween. The end rings are sized to establish an interference fit with bore 112 to prevent leakage of fluid from channels 116 and 136. As seen, divider plate 154 separates channel 116 and 136. This arrangement is a significant improvement over known prior art arrangements with separate fluid delivery bores since a single central bore 112 can be easily machined and yet permit establishment of a number of distinct flow channels. In the embodiment shown, the centerline "C" of separator insert 114 is aligned with rotary axis "A" such that channels 116 and 136 have substantially similar volumes. To prevent distortion of separator insert 114 due to introduction of high pressure fluid into one or both of the channels, divider plate 154 is sized to have a sufficient thickness based on the fluid pressure and type of material used to fabricate the separator insert 114. It is contemplated that separator insert 114 be made of any suitable material to provide a fluid tight seal with bore 112 and the required rigidity. As an option, a rigid metallic core member may be over-molded with plastic or rubber to provide the required strength and rigidity.

Figure 5:
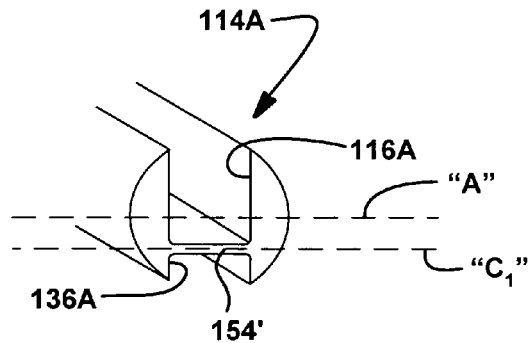
FIG. 5 is a partial perspective view of a separator insert according to a second embodiment of the present invention.

Referring to FIG. 5, a modified version of separator insert 114 is partially shown and identified by reference numeral 114A. As seen, first channel 116A is larger than second channel 136A with the centerline "$C_1$" of divider plate 154' offset from rotary axis "A". Such an arrangement illustrates the ability to design the size of the flow channels to accommodate the different pressure and flow requirements of compounder assembly 24.

Figure 6:
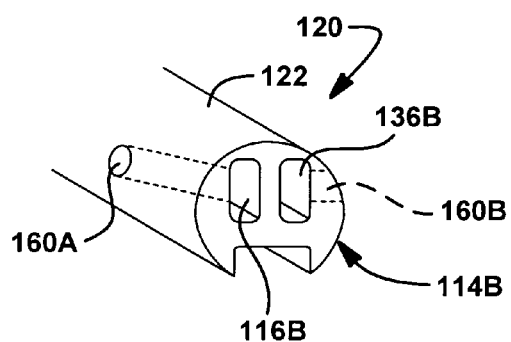
FIG. 6 and 7 are a partial perspective views of a separator insert according to third and fourth embodiments of the present invention.
Figure 7:
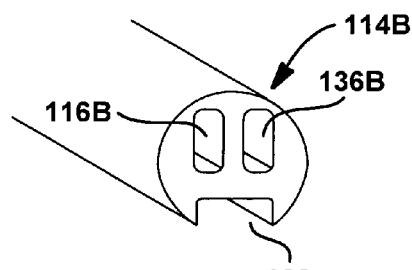
Figure 8:
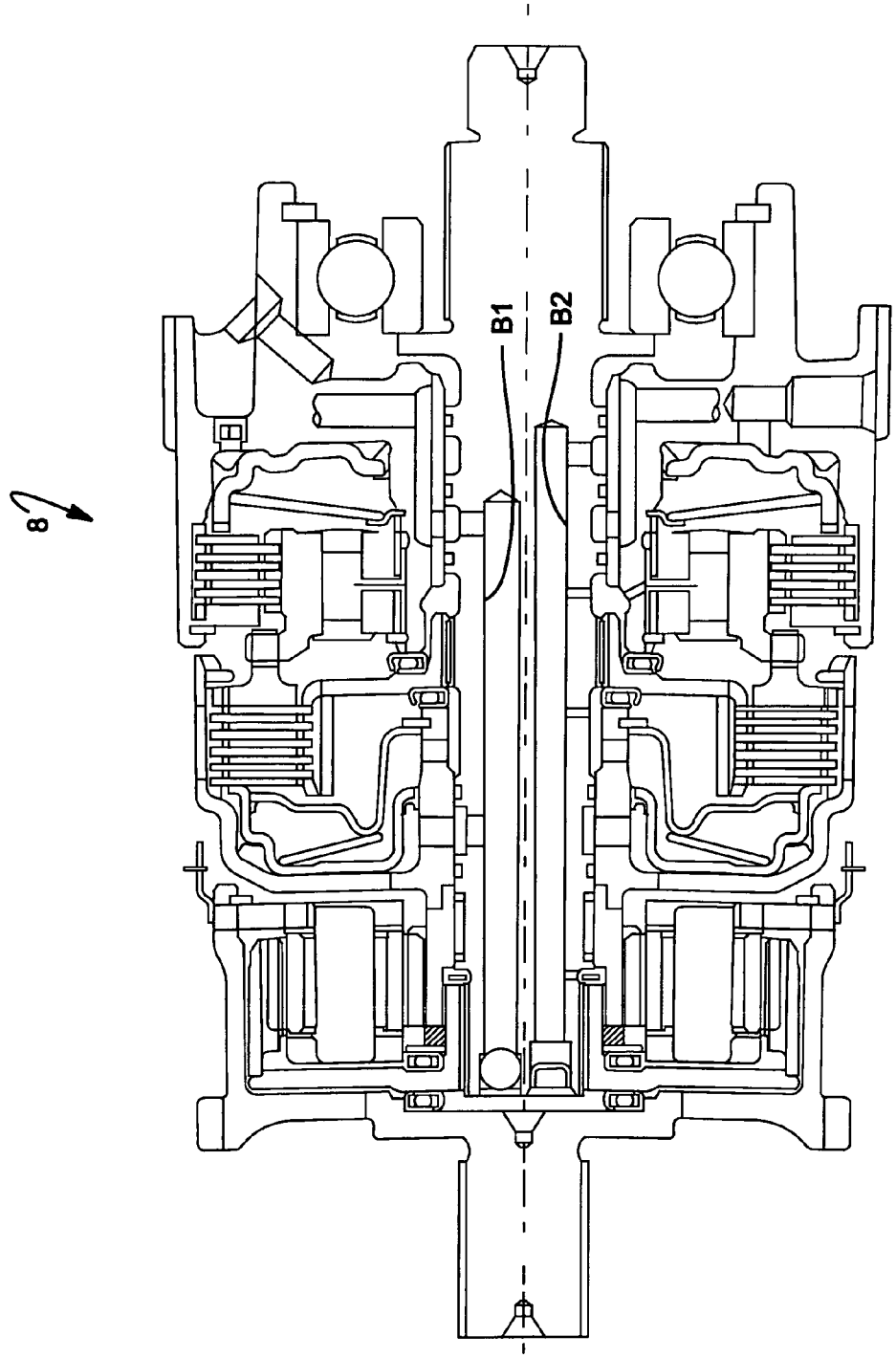
FIG. 8 is a sectional view illustrating a prior art compounder assembly.

Referring to FIG. 6, a further alternative version of separator insert 114 is partially shown and identified by reference numeral 114B. As seen, flow channels 116B and 136B are formed in a side-by-side parallel arrangement with each having a corresponding inlet port 160A and 160B adapted to be aligned and communicate with a corresponding inlet bore in input shaft 36. Finally, FIG. 7 is a modified version of FIG. 6 wherein an additional flow channel is provided to define three distinct flow channels. A third flow channel 162 can be used for lubricant delivery while channels 116B and 136B provide high pressure fluid to the friction clutches.

Those skilled in the art of power transmission devices, particularly of the type used in motor vehicle drivelines, will appreciate that the port separator insert of the present invention can be used in a plethora of applications and is not limited to use in the compounder assembly shown. Rather, it is contemplated that this concept of providing multiple flow channels in a single central bore can be used in transmissions, axle assemblies, transfer cases, torque couplings, power take-offs and all other power transmission devices which require at least two distinct fluid flow pressure paths.

The forgoing discussion discloses and describes an exemplary embodiment of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A power transmission assembly, comprising
a first shaft having a central bore;
a second shaft;
a gearset operably disposed between said first shaft and said second shaft;
a first hydraulically-actuated transfer device operable for causing said gearset to establish a first speed ratio drive connection between said first and second shafts;
a second hydraulically-actuated transfer device operable for causing said gearset to establish a second speed ratio drive connection between said first and second shafts; and
a separator insert disposed in said central bore of said first shaft, said separator insert includes a divider plate defining a first fluid flow path for supplying fluid to actuate said first transfer device and a second fluid flow path for supplying fluid to actuate said second transfer device, said divider plate is offset from a rotary axis of said first shaft such that said first fluid flow path has a greater volume than said second fluid flow path.

2. The power transmission assembly of claim 1 wherein said divider plate is substantially aligned with said rotary axis of said first shaft such that said first and second fluid flow paths have substantially similar volumes.

3. The power transmission assembly of claim 1 wherein said separator insert further includes first and second end rings connected to opposite ends of said divider plate that are sized to establish a fluid-tight seal with said central bore.

4. The power transmission assembly of claim 1 wherein said separator insert defines a third fluid flow path for carrying fluid to lubricate one of said first and second hydraulically-actuated transfer devices.

5. A power transmission assembly for transmitting rotary power from a power source to an output component, comprising:
a first shaft adapted to be driven by the power source, said first shaft including a central bore having first and second inlet ports and first and second outlet ports;
a second shaft adapted to drive the output component; and
a separator insert disposed in said central bore of said first shaft, said separator insert having a divider plate offset from a rotary axis of said first shaft for defining a first fluid flow path between said first inlet and outlet ports for carrying a fluid at a first pressure to a first predetermined location and a second fluid flow path between said second inlet and outlet ports for carrying said fluid at a second pressure to a second predetermined location, and wherein said first fluid flow path has a greater volume than said second fluid flow path.

6. The power transmission assembly of claim 5 further comprising a transfer device operably disposed between said first and second shafts and a hydraulic actuator for engaging said transfer device, and wherein said first predetermined location is a pressure chamber associated with said hydraulic actuator.

7. The power transmission assembly of claim 6 wherein said second flow path is arranged to carry fluid to lubricate said transfer device.

8. The power transmission assembly of claim 5 wherein said separator insert defines a third fluid flow path between a third inlet port and a third outlet port for carrying a fluid at a third pressure to a third predetermined location.

9. A vehicle, comprising:
a power source;
a driveline assembly; and
a power transmission assembly for transmitting rotary power from said power source to said driveline assembly, said power transmission assembly including a first shaft adapted to be driven by said power source and having a central bore defining first and second inlet ports and first and second outlet ports, a second shaft adapted to drive said driveline assembly, a friction clutch operably disposed between said first shaft and said second shaft, and a separator insert disposed in said central bore and having a divider plate offset from a rotary axis of said first shaft for defining a first fluid flow path between said first inlet and outlet ports for carrying fluid at a first fluid pressure to a first predetermined location and a second fluid flow path between said second inlet and outlet ports for carrying fluid at a second fluid pressure to a second predetermined location, and wherein said first fluid flow path has a greater volume than said second fluid flow path.

10. The vehicle of claim 9 wherein said power transmission assembly further includes a hydraulic actuator for engaging said friction clutch, and wherein said first predetermined location is a pressure chamber associated with said hydraulic actuator.

11. The vehicle of claim 10 wherein said power transmission assembly further includes a second friction clutch and a second hydraulic actuator for engaging said second friction clutch, and wherein said second predetermined location is a pressure chamber associated with said second hydraulic actuator.

12. The vehicle of claim 9 wherein said second flow path is arranged to carry fluid to cool said friction clutch.

13. The vehicle of claim 9 wherein said second flow path is arranged to carry fluid to lubricate a gearset.

14. The vehicle of claim 9 wherein said separator insert defines a third fluid flow path between a third inlet port and a third outlet port for carrying a fluid at a third pressure to a third predetermined location.

* * * * *